(12) United States Patent
Frenken et al.

(10) Patent No.: US 11,260,519 B2
(45) Date of Patent: Mar. 1, 2022

(54) HAND-HELD TOOL

(71) Applicant: GUSTAV KLAUKE GMBH, Remscheid (DE)

(72) Inventors: Egbert Frenken, Heinsberg (DE); Andreas Lehr, Neuss (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 0 days.

(21) Appl. No.: 16/652,953

(22) PCT Filed: Oct. 1, 2018

(86) PCT No.: PCT/EP2018/076582
§ 371 (c)(1),
(2) Date: Apr. 1, 2020

(87) PCT Pub. No.: WO2019/068608
PCT Pub. Date: Apr. 11, 2019

(65) Prior Publication Data
US 2020/0269410 A1    Aug. 27, 2020

(30) Foreign Application Priority Data

Oct. 2, 2017  (DE) .............................. 2017122855.1
Jan. 31, 2018  (DE) .............................. 2018102162.3

(51) Int. Cl.
*B25F 5/02*    (2006.01)
*B23D 29/02*    (2006.01)
*B23D 35/00*    (2006.01)

(52) U.S. Cl.
CPC .............. *B25F 5/02* (2013.01); *B23D 29/02* (2013.01); *B23D 35/001* (2013.01)

(58) Field of Classification Search
CPC ..................................................... B25F 5/02
See application file for complete search history.

(56) References Cited

U.S. PATENT DOCUMENTS 4,707,921 A    11/1987 Meyer et al.
4,736,804 A *   4/1988 Geibel ................. B25H 1/0035
                                                          173/30

(Continued)

FOREIGN PATENT DOCUMENTS

DE    10 2008 024 018 A1    11/2008
DE    10 2012 212 786 A1    1/2014

(Continued)

OTHER PUBLICATIONS

International Search Report for International Patent Application No. PCT/EP2018/076582 dated Feb. 21, 2019, 5 pages.

(Continued)

*Primary Examiner* — Nathaniel C Chukwurah
*Assistant Examiner* — Lucas E. A. Palmer
(74) *Attorney, Agent, or Firm* — Klintworth & Rozenblat IP LLP

(57) ABSTRACT

A hand-held tool that is prepared for remote control has a handle region, an actuating button, and a removable attachment part held in the handle region. The attachment part has a handling extension and a collar encompassing the handle region. The collar includes first and second collar parts pivotably connected together. The attachment part acts upon the actuating button. The actuating button is displaced into an actuating position by a housing section of the collar for a duration of an arrangement of the attachment part on the handle region.

19 Claims, 7 Drawing Sheets

(56) References Cited

U.S. PATENT DOCUMENTS

| | | | |
|---|---|---|---|
| 5,787,590 A * | 8/1998 | D'Alessandro, Sr. | A01G 3/053 16/429 |
| 6,718,870 B1 | 4/2004 | Frenken | |
| 6,904,687 B1 * | 6/2005 | Hill, Sr. | B27B 17/00 30/296.1 |
| 7,254,982 B2 * | 8/2007 | Frenken | B25B 27/10 60/477 |
| 7,258,261 B1 * | 8/2007 | Reyes | B25C 7/00 173/170 |
| 9,102,043 B2 * | 8/2015 | Morin | B25B 31/00 |
| 2003/0168491 A1 * | 9/2003 | Goodwin | B25C 7/00 227/147 |
| 2005/0000713 A1 * | 1/2005 | Pourtler | B25C 7/00 173/29 |
| 2005/0120770 A1 * | 6/2005 | Frenken | B25F 5/02 72/453.16 |
| 2005/0276670 A1 * | 12/2005 | Freund | B25H 1/0035 408/129 |
| 2012/0126560 A1 * | 5/2012 | Ockleston | B25F 5/021 294/210 |
| 2012/0284997 A1 * | 11/2012 | Morin | G01R 1/22 29/525.01 |
| 2014/0102739 A1 * | 4/2014 | Tamm | H02G 1/02 173/1 |
| 2015/0314434 A1 * | 11/2015 | Bevins, Jr. | B25F 5/00 30/514 |
| 2016/0344170 A1 * | 11/2016 | Tamm | H02G 1/005 |
| 2018/0009096 A1 * | 1/2018 | Grazioli | B25C 7/00 |
| 2018/0126541 A1 * | 5/2018 | Jeremenko | H02G 1/02 |
| 2018/0345441 A1 * | 12/2018 | Nix | B24B 7/184 |

FOREIGN PATENT DOCUMENTS

| | | | |
|---|---|---|---|
| DE | 102012212786 A1 * | 1/2014 | B25G 1/04 |
| EP | 1084798 A2 | 3/2001 | |
| EP | 1519813 A2 | 4/2005 | |
| WO | 2015/025677 A1 | 2/2015 | |
| WO | WO-2015025677 A1 * | 2/2015 | B25F 5/00 |
| WO | 2016/134951 A1 | 1/2016 | |
| WO | 2017/125272 A1 | 7/2017 | |

OTHER PUBLICATIONS

Written Opinion for International Patent Application No. PCT/EP2018/076582 dated Feb. 21, 2019, 6 pages.
International Preliminary Report on Patentability for International Patent Application No. PCT/EP2018/076582 dated Sep. 4, 2019, 6 pages.
Machine Translation of DE 10 2008 024 018 A1.
Machine Translation of DE 10 2012 212786 A1.
Machine Translation of WO 2017/125272 A1.
Machine Translation of WO 2015/025677 A1.
Machine Translation of WO 2016/134951 A1.

* cited by examiner

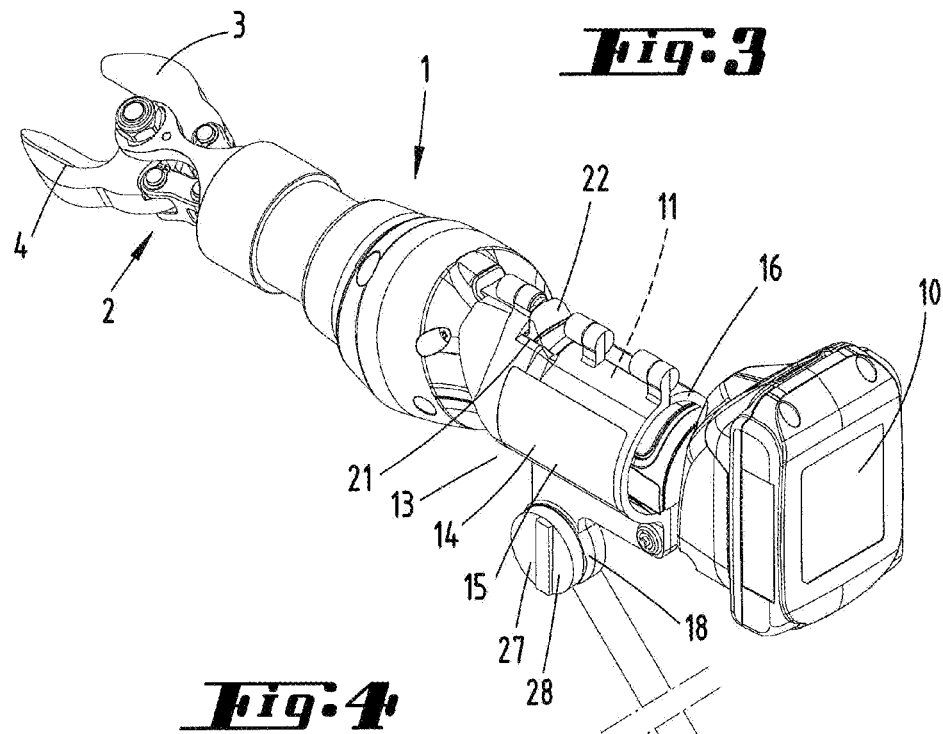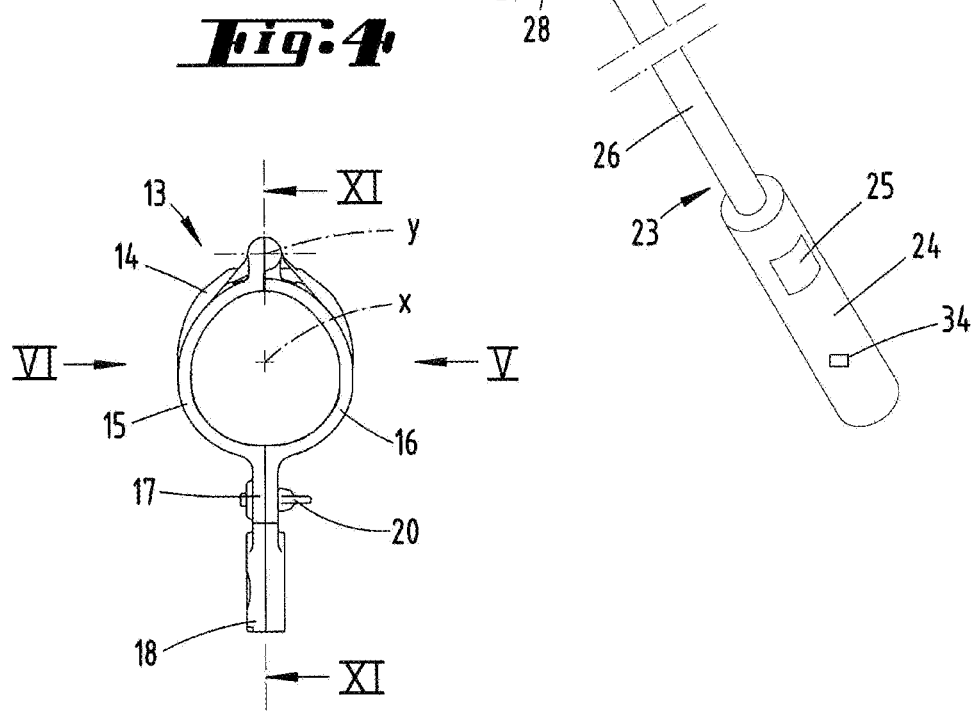

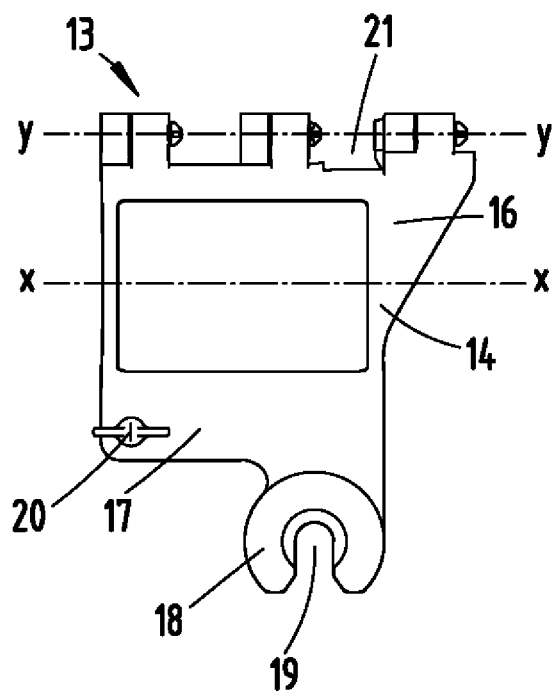
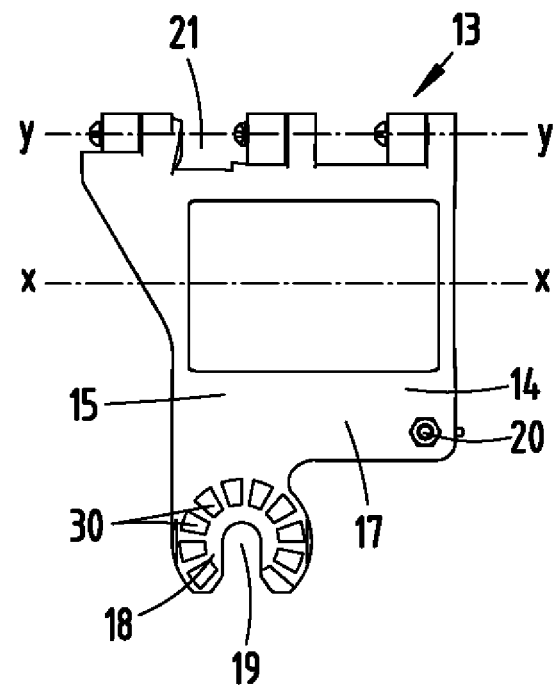
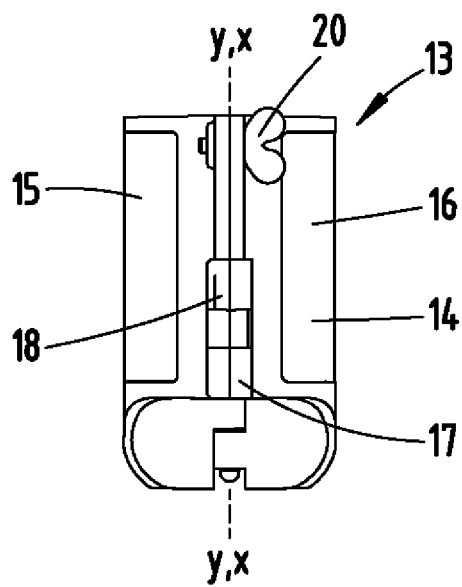
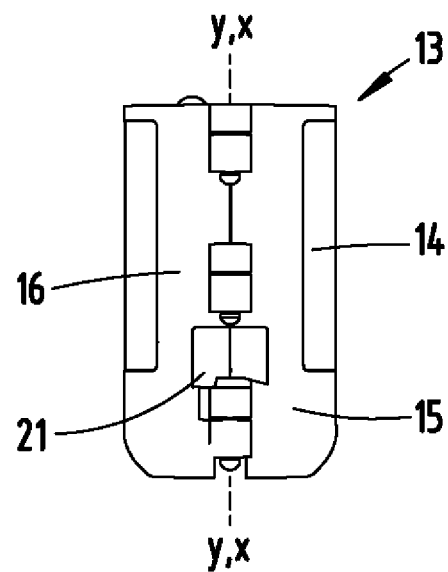

HAND-HELD TOOL

TECHNICAL FIELD

The invention pertains to a hand tool that is prepared for remote control and has a handle region and an actuating button.

Prior Art

Hand tools of the type in question are generally known. For example, they are known in the form of cutting or pressing devices, e.g. according to EP 1 084 798 B1 (U.S. Pat. No. 6,718,870 B1) or also according to EP 1 519 813 B1 (U.S. Pat. No. 7,254,982 B2).

Such hand tools may comprise an optionally exchangeable working head, e.g. for cutting cables or lines. In this respect, we refer, for example, to motor-operated shears known from WO 2017/125272 A1.

The content of these patent applications or patent documents is hereby fully incorporated into the disclosure of the present invention, namely also for the purpose of incorporating characteristics of these patent applications or patents into claims of the present invention.

DE 10 2012 212 786 A1 discloses a hand tool with a guide rod arrangement that has a machine tool actuating unit. The machine tool can be switched on and/or off with the actuating unit in order to process a workpiece. An electronic coupling element that interacts with a corresponding electronic coupling element of the machine tool is provided for this purpose.

WO 2015/025677 A1 discloses a hand tool that represents the actuating handle of a remote control. The hand tool is actuated on the actuating handle itself.

US 6,904,687 B1 discloses a tree maintenance apparatus, in which the attachment part is designed for acting upon the actuating button. For this purpose, a bolt is to be pushed through the attachment part that is realized with a U-shaped cross section, wherein said bolt in turn holds an actuating button in the depressed state.

US 4,707,921 A discloses an attachment part, in which a blocking element of the actuating button is in the attached state of the attachment element acted upon in such a way that the actuating button can be freely operated.

US 2016/0344170 A1 discloses a tool that can be controlled remotely, wherein the control of the tool takes place via a radio interface.

DE 10 2008 024 018 A1 discloses a pressing device that has no remote control.

SUMMARY OF THE INVENTION

Based on the above-described prior art, the invention aims to disclose an advantageous remote control for a hand tool.

This objective is initially attained with the object of claim 1, wherein it is proposed that the attachment part is designed for acting upon the actuating button and that the actuating button is displaced into the actuating position by a housing section of the collar for the duration of the arrangement of the attachment part on the handle region.

This objective is furthermore attained with the object of claim 2, wherein it is proposed that a housing tang, which defines the actuating button toward the handle region, extends in an encompassing position through a window-like opening provided in the pivot joint region of the collar.

According to a first inventive idea, the above-defined objective is potentially attained with a hand tool, in which a removable attachment part held in the handle region is provided, wherein the attachment part has a handling extension.

The attachment part is a part that is realized separately of the hand tool and preferably can be respectively mounted or removed without tools or by using a usually available tool such as a screwdriver or a pair of pliers. The hand tool can be provided with the attachment part in order to realize its remote control. In a potential embodiment, the hand tool can be directly or indirectly held by the user with the aid of the attachment part. In a potential embodiment, this is realized with a handling extension that can be connected to the attachment part.

As a result of the proposed design, the user is able to control the hand tool remotely by means of a stand-like holder. In this case, the hand tool is directly guided by the user. This simplifies the work to be performed with the hand tool in areas that are difficult to access. The hand tool can be guided to the location to be worked on with the hand tool and subsequently controlled remotely by means of the attachment part and preferably the handling extension.

The handling extension may be realized in a rod-like manner and optionally have a handle in the region of a free end. For example, the handling extension has a maximum length, which may correspond to 10-times to 100-times or more, e.g. up to 1000-times, the maximum width of the handling extension extending transverse thereto. The diameter of the handle particularly may be enlarged in comparison with the remaining rod.

In another embodiment, the handling extension, particularly a rod-shaped handling extension, may be realized in the form of a telescoping and therefore length-adjustable rod. In a potential embodiment, such a telescoping rod can be fixed in any extended position. For example, the rod may altogether consist of two, three, four or more individual rods that telescopically engage into one another.

The handling extension may also be realized separately of the attachment part and accordingly arranged on the attachment part during its preferred use. In this respect, it would also be possible that the handling extension is permanently arranged on the attachment part or optionally realized in one piece with the attachment part. In a potential two-part design, the mounting or removal preferably can be realized without tools.

In order to allow favorable handling, the handling extension may be coupled to the attachment part in different angular orientations with respect to a longitudinal axis of the attachment part. In a potential and preferred embodiment, the longitudinal axis of the attachment part is in the attached position oriented in the same direction as a longitudinal axis of the hand tool. The longitudinal axis of the handling extension can be respectively coupled to or fixed on the attachment part in different angular orientations with respect to the longitudinal axis of the attachment part. Fixing in the desired angular position preferably can be realized without tools, e.g. by manually actuating a clamping part.

The longitudinal axis of the handling extension and the longitudinal axis of the attachment part may include an angle, for example, between approximately 15 degrees and approximately 165 degrees, as well as angular amounts between the two aforementioned amounts such as 30 degrees or 65 degrees or 102 degrees. Angular positions may also be assumed incrementally, e.g. every 15°, 30° or 45°. A continuous adjustment is alternatively conceivable.

In a potential embodiment, the handling extension may be permanently or removably arranged on the attachment part so as to be pivotable about a geometric axis that is oriented transverse to its longitudinal axis.

The attachment part is designed for acting upon the actuating button of the hand tool. The attachment part acts upon the actuating button permanently as soon as it is fixed on the handle region of the hand tool. The attachment part displaces a usually hand-operated pushbutton of the hand tool.

In another embodiment, the hand tool may be designed for radio remote control and for this purpose comprise a radio receiver and a control unit that is designed for converting the received radio signals into an initiation of a working motion of the hand tool. For example, a Bluetooth connection, as well as a WLAN or WPAN connection, may be used for the radio remote control.

In a potential embodiment, the energy supply, e.g. of the radio receiver and the control unit, may be realized by means of an accumulator or the like that also supplies the hand tool. A separate energy supply may also be realized, e.g. by providing an accumulator for the radio and control units only.

The handling extension may have an actuating element for initiating a working motion of the hand tool remotely. The actuating element may be realized in the form of a switch or pushbutton or, for example, in the form of a sensor such as a capacitive sensor. In a preferred embodiment, the actuating element is positioned in an ergonomically favorable manner in the region of a handle, e.g. in the region of a handle of a handling part.

In this context, it is advantageous if the handling extension has a radio transmitter that is functionally connected to the actuating element and serves for functionally interacting with the radio receiver of the hand tool. The actuation of the actuating element by the user initiates the transmission of a corresponding signal by the radio transmitter, wherein said signal is received by the radio receiver in the hand tool and can be converted into a signal for initiating a working motion of the hand tool by the control unit of the tool.

An energy storage, e.g. in the form of an accumulator, may be provided in the handling extension, particularly for the energy supply of the radio sensor, but also for the energy supply of an additionally provided control unit, etc. In an alternative embodiment, the energy supply may also be realized by means of the power supply of the hand tool via the attachment part. In this case, corresponding electric contacting takes place when the attachment part is attached to the hand tool.

The attachment part is realized in the form of a collar that is designed for encompassing the handle region. In this case, the collar can be attached to the handle region in such a way that the hand tool is captively encompassed. For example, the collar may be clamped around the handle region of the hand tool by generating a spring force.

The collar consists of two collar parts that are pivotably connected to one another in order to allow its favorable mounting and removal. For example, these collar parts can be respectively pivoted into an open and a closed position, preferably about an axis that is oriented in the same direction as the longitudinal axis of the attachment part. This simplifies the arrangement on the hand tool, as well as the corresponding removal.

For this purpose, a collar part may essentially be realized in an approximately half shell-shaped manner in a cross section transverse to the extent of the longitudinal axis.

The collar parts can be mechanically interlocked in the encompassing position. The interlock may be realized, e.g., with a catch mechanism. The interlock can likewise be disengaged, preferably in a non-destructive manner, in order to remove the attachment part. For example, a screw connection may also be provided in this respect. However, it is preferred that the collar parts can be interlocked and unlocked without tools.

In a potential embodiment, a holding formation for the handling extension may be provided on the attachment part. The holding formation can allow the removal of the handling extension.

The holding formation may comprise a plurality of projections, which serve for engaging into correspondingly positioned and adapted depressions in the handling extension, in order to fix the handling extension on the attachment part and, in a potential embodiment, to angularly fix the handling extension relative to the attachment part. Alternatively, the holding formation may comprise a plurality of depressions, which serve for receiving correspondingly positioned and dimensioned projections on the handling extension.

For example, respective depressions or projections may be provided on the holding formation within predefined angular intervals with respect to a potential pivoting axis, about which the handling extension may be pivotable relative to the attachment part, wherein the handling extension may be fixable in predefined angular increments, e.g. 15 degree increments, by utilizing said depressions or projections.

The hand tool may comprise an electric motor that can be actuated in order to carry out a working motion. During normal handling of the hand tool, the operation of the electric motor is initiated as a result of an actuation of the actuating button in the handle region. In an inventive remote control, the electric motor is in a potential embodiment actuated by means of a generated radio signal, which is correspondingly converted by the control unit.

The electric motor may drive a spindle in the hand tool. The electric motor may alternatively drive a hydraulic pump for acting upon a hydraulically actuated working piston. The tool is acted upon by the spindle or the working piston.

The hand tool may comprise one or more working jaws that can be moved from a release position into a working position and from a working position into a release position. The working jaws may be realized in the form of cutting edges. In addition, only one working jaw, which can be displaced from a release position into a working position and vise versa, may be realized, e.g., in the form of a cutting edge and interact with a stationary counter working jaw.

The hand tool may also be designed for automatically moving the working jaw from the working position into the release position after the expiration of a predefined time period.

In order to carry out a working process such as the motion, e.g. cutting motion, of the working jaw from the release position into the working position, a potential radio remote control requires a radio signal that is generated as a result of an actuation of the actuating element and persists until the working position is reached. A potential interruption of the radio connection preferably leads to the immediate standstill of the working jaw. If this radio connection is not reestablished within a predefined time period, e.g. between 20 and 60 seconds or within 30 seconds, or if no new signal is received from the transmitter within this time period, the working jaw is automatically moved back from this working position or intermediate position into the release position, which preferably corresponds to the home position.

In a potential embodiment, in which the attachment part is designed for acting upon the actuating button of the hand tool, an (initially) permanent line connection is produced, which can ultimately lead to a complete discharge of the accumulator of the hand tool. If the actuating button is not moved (back into a non-actuated position), the line connection preferably is interrupted after the expiration of a predefined time period, e.g. 15 to 60 minutes or approximately 30 minutes. The control unit provided in the hand tool monitors if the predefined time period is exceeded. An electronic switch can interrupt the current-conducting connection when the time period is exceeded, e.g. by utilizing an electronic switch (semiconductor switch) such as a thyristor or the like.

The attachment of the attachment part to the hand tool can be detected by the hand tool. In a potential embodiment, a (separate) pushbutton or sensor may be provided for this purpose, e.g. in the handle region, in which the attachment part should be arranged. A contactless detection would also be possible in this respect, e.g. by means of an RFID sensor. A detected attachment part preferably transfers the hand tool from a hand-operated mode into a remote-controlled mode.

The remote-controlled mode may also be manually adjusted by the user in advance, wherein the hand tool subsequently searches for a coupling partner (attachment part) in the surroundings, e.g. via Bluetooth. This search preferably concerns a predefined partner, e.g. with only one individualized address.

Polling ("polling timer") of the actuating buttons of the hand tool and optionally the attachment part preferably also takes place in the coupled state. The connection may be interrupted if no signal of the attachment part is detected within a predefined time period during the continuous polling process.

It is preferred that a working cycle can in the hand-operated mode only be initiated by means of a so-called "double-click" on the pushbutton of the hand tool. Accordingly, no initiation is achieved in such an embodiment by simply attaching the attachment part and thereby acting upon the pushbutton.

It is also preferred that a signal can only be initiated with the actuating element on the attachment part or the handling extension by means of a "double-click" in order to thereby prevent an inadvertent operation.

According to a preferred embodiment, the attachment part and/or the handling extension may provide electrically insulating properties.

BRIEF DESCRIPTION OF THE DRAWINGS

The invention is described in greater detail below with reference to the attached drawings that merely show an exemplary embodiment. In these drawings:

FIG. 3 shows a perspective view that essentially corresponds to FIG. 1 after the hand tool and the arrangement of the handling extension on the attachment part;

FIG. 4 shows a front view of the attachment part concerning an encompassing position;

FIG. 5 shows the view according to the arrow V in FIG. 4;

FIG. 6 shows the view according to the arrow VI in FIG. 4;

FIG. 7 shows a bottom view of the attachment part;

FIG. 8 shows a top view of the attachment part;

DESCRIPTION OF THE EMBODIMENTS

Figure 1:
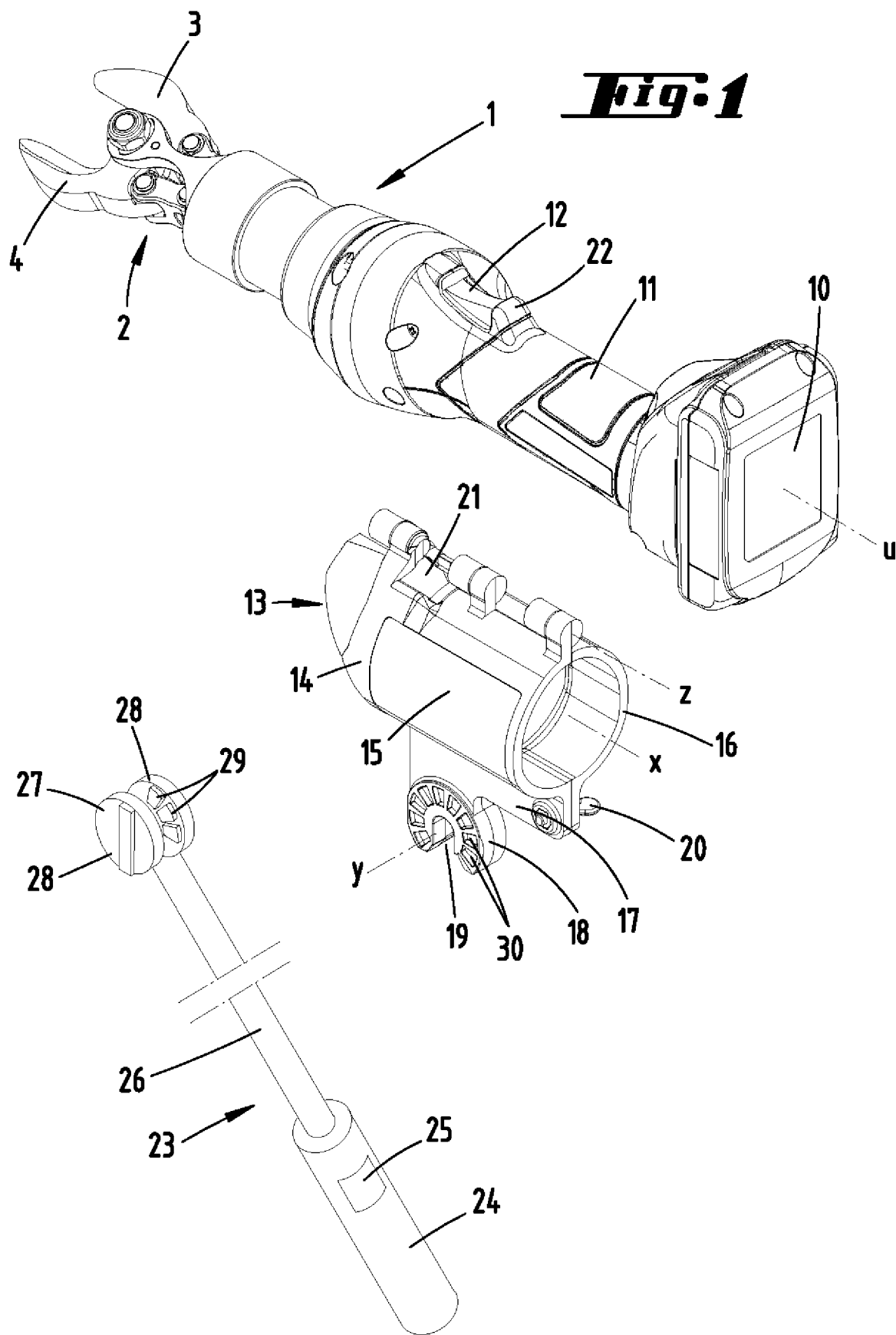
FIG. 1 shows a hand tool with an associable attachment part and a handling extension in the form of a perspective exploded view.

A hand tool 1 in the form of an electromotively driven hand tool is initially described with reference to FIG. 1. The illustration according to FIG. 1 shows an electrohydraulic device that is essentially realized in an elongate, rod-shaped manner and thereby facilitates the one-handed operation of the device. Such a rod-shaped device is known from initially cited EP 1 519 813 B1. The hand tool 1 may also be realized in the form of a pistol-shaped electrohydraulic device, e.g. in accordance with FIG. 12. A device of this type is known from initially cited EP 1 084 798 B1.

A working head 2 is arranged on the hand tool 1 and comprises two working jaws 4 in the exemplary embodiment shown. These working jaws may be realized in the form of cutting edges and pivotable from a release position into a working position about a rotational axis. With respect to the working head 2 shown, we refer to initially cited WO 2017/125272 A1.

The working head 2 shown is merely exemplary. It is preferably exchangeable. For example, the hand tool 1 can thereby also be used as a pressing device or the like, e.g. as a punching device.

Figure 2:
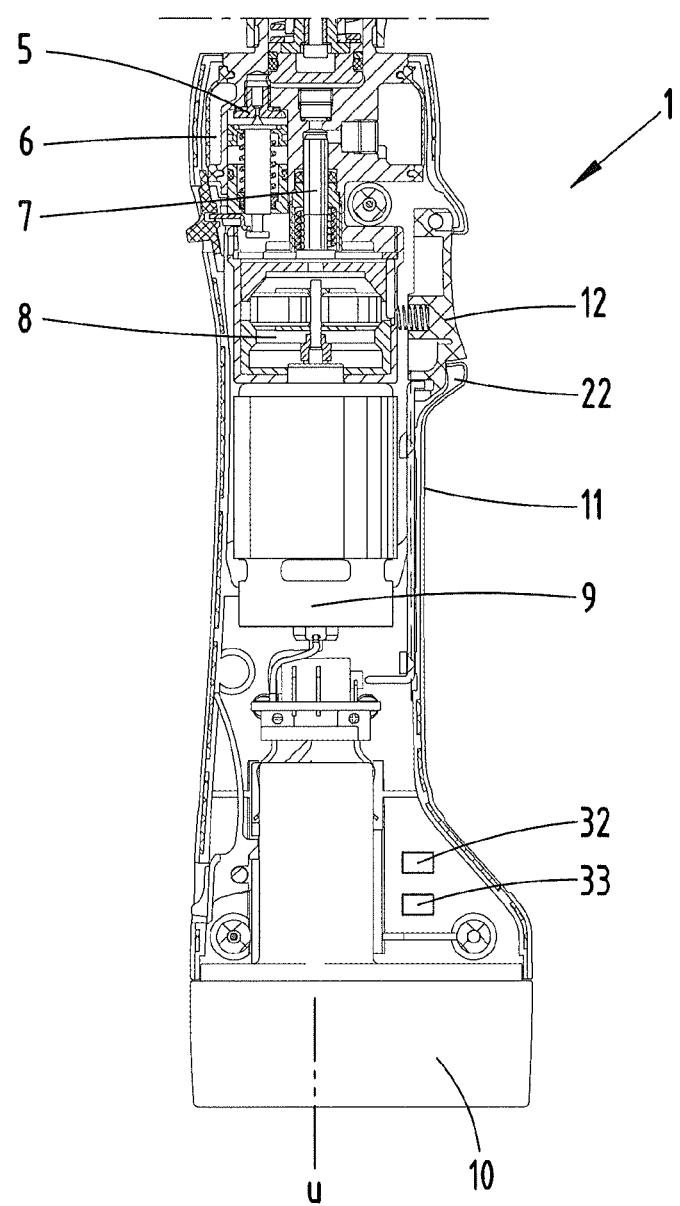
FIG. 2 shows the hand tool in the form of a longitudinal section.

In the illustration according to FIG. 2, the correlation with the object described in aforementioned EP 1 519 813 B1, e.g. with respect to a return valve 5, a tank 6 and a pump tappet 7, can be seen in the upper region of the hand tool 1 that is realized in the form of a base unit. This figure likewise shows that a hydraulic medium pump 8 and an electric motor 9 for the hydraulic medium pump 8 are arranged behind one another. The electrical supply, particularly of the electric motor 9, but also of a not-shown control unit and other electronic components in the hand tool 1, is realized by means of an accumulator 10.

The hand tool furthermore has a handle region 11 for conventionally encompassing the hand tool housing with one hand. An actuating button 12 is associated with the handle region 11 in an ergonomically favorable manner.

An attachment part 13 can be associated with the hand tool 1, particularly its handle region 11, in order to control the hand tool 1 remotely. This attachment part may be realized in the form of a collar 14, which in the embodiment shown comprises to half shell-shaped collar parts 15 and 16.

The collar parts 15 and 16 can be connected to one another, e.g. in a preferably pivotable manner, wherein the collar parts can be pivoted about a geometric pivoting axis y that preferably extends in the direction of a longitudinal axis x of the collar 14.

With respect to its inner cross section and/or length, the closed collar 14 is adapted to the shape of the housing of the hand tool 1 in the handle region 11.

Tab-like brackets 17 may be integrally formed on the collar parts 15 and 16 diametrically opposite of their joint region, wherein said brackets in turn respectively carry or form a holding formation 18.

In a side view according to FIG. 5 or 6, the holding formation 18 may be realized in an essentially U-shaped manner with a U-opening 19 that points away from the pivoting axis y.

Figure 12:
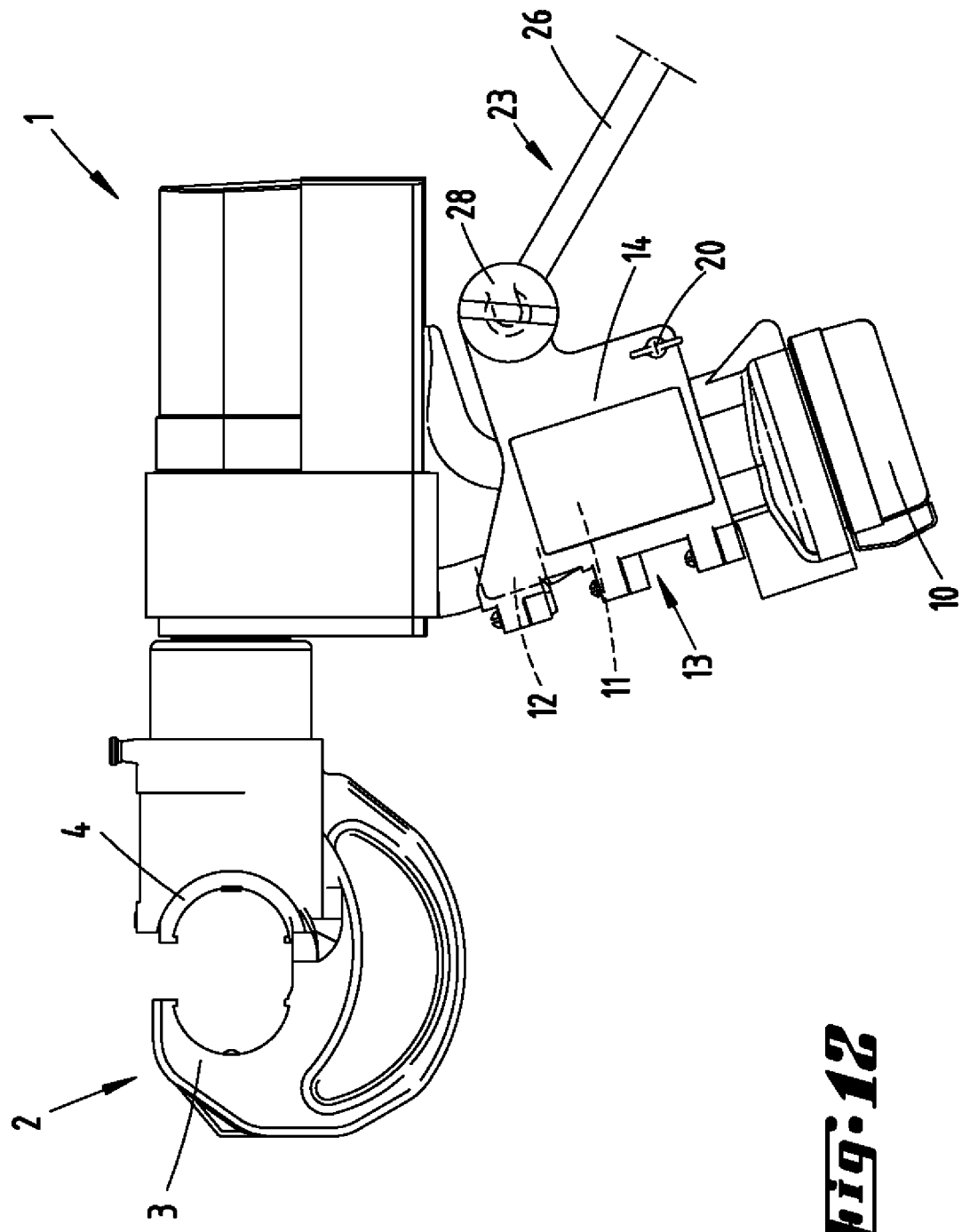
FIG. 12 shows an alternative variation of the arrangement of the attachment part on the hand tool.

The closed position of the collar 14 or the encompassing position of the collar 14 according to the illustration in FIG. 3 or FIG. 12 can be mechanically interlocked. In the exemplary embodiment shown, this is achieved by using a screw connection 20 that acts in the region of the brackets 17.

The attachment part 13 serves for allowing a remote control of the hand tool 1 according to the illustration in FIG. 3 or FIG. 12.

Figure 9:
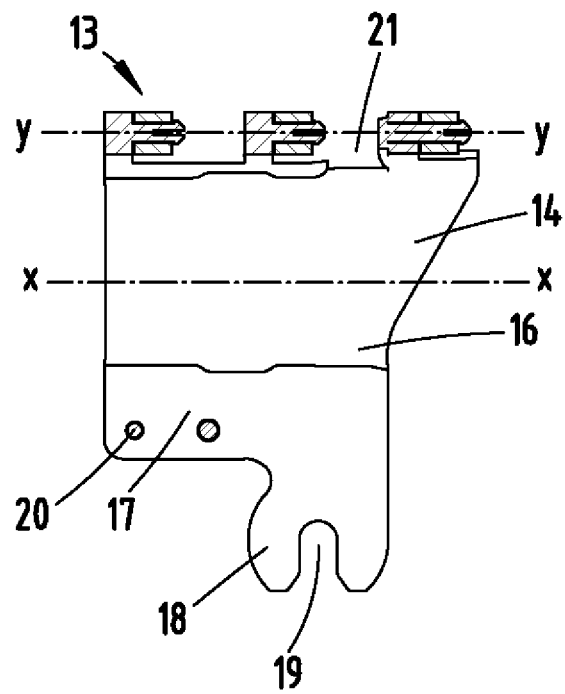
FIG. 9 shows the section along the line IX-IX in FIG. 4.
Figure 10:
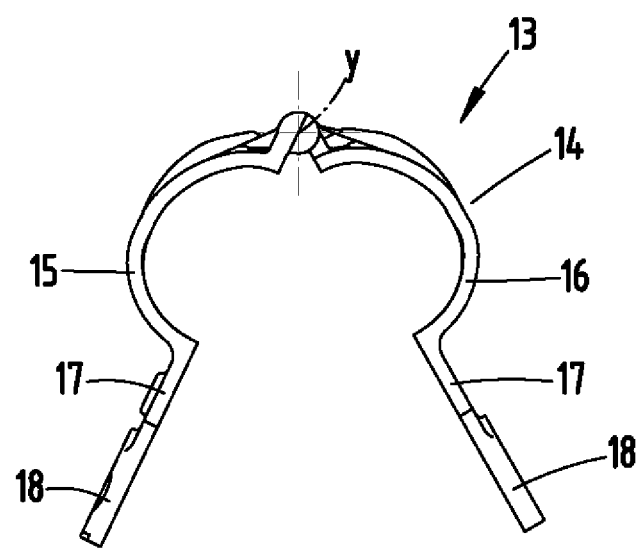
FIG. 10 shows a view that essentially corresponds to FIG. 4 concerning the open pivoting position of the attachment part.

For this purpose, the attachment part 13 shown is initially pivoted into the open position about the pivoting axis y (see also FIG. 9) by disengaging the interlock produced by the screw connection 20 and then placed over the handle region 11. The attachment part 13 is fastened on the hand tool 1 in the handle region 11 and preferably fixed with respect to a longitudinal axis u of the handle region 11, as well as in the circumferential direction, by closing and subsequently interlocking the collar parts 15 and 16 with the aid of the screw connection 20. The attachment part preferably is fixed in a clamping manner.

The longitudinal axis u of the handle region 11 and the longitudinal axis x of the attachment part 13 preferably are oriented in the same direction and optionally coincide.

Figure 11:
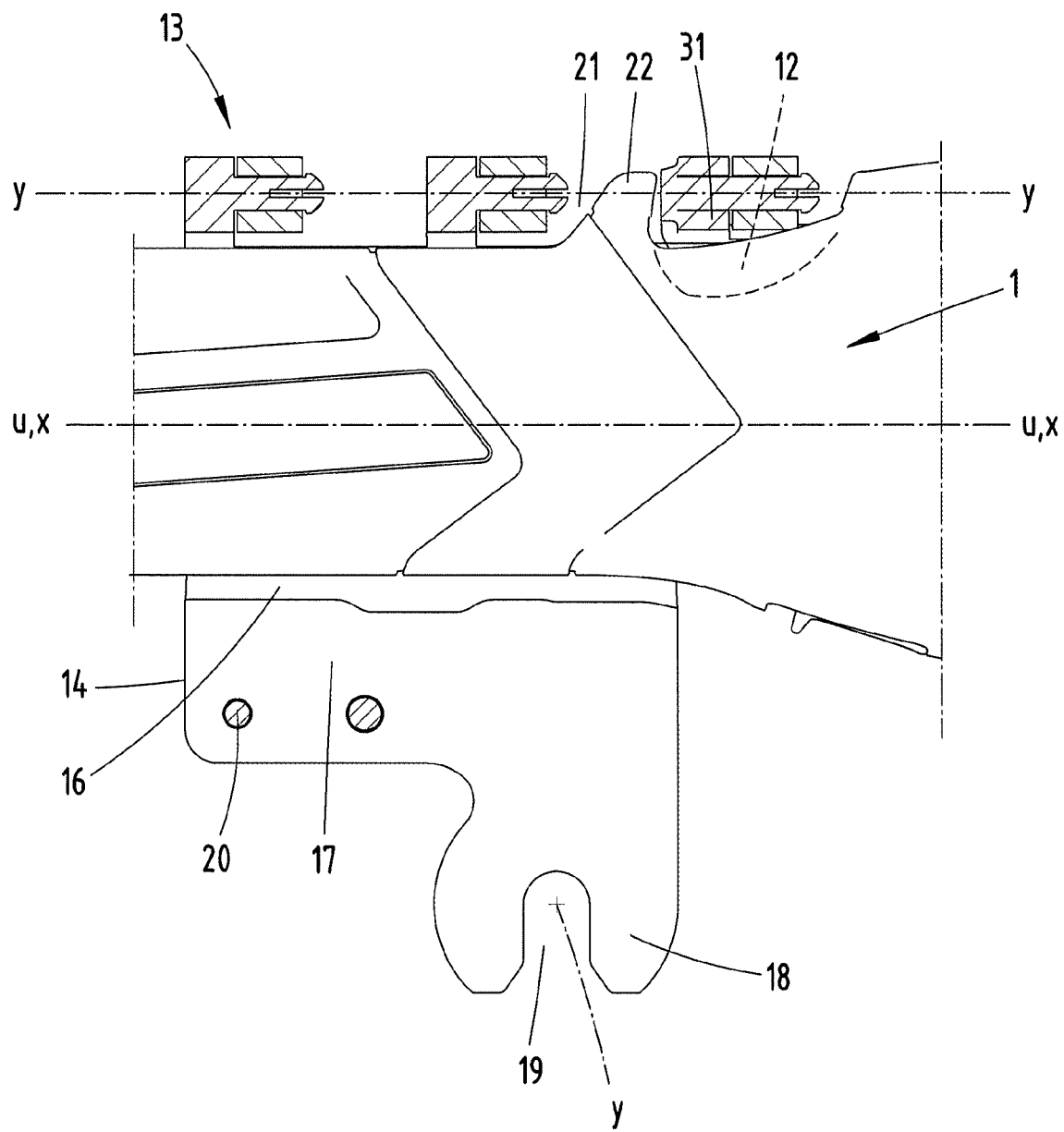
FIG. 11 shows a section through the attachment part according to FIG. 9 when it encompasses the handle region of the hand tool.

In the encompassing position, a housing tang 22 that defines the actuating button 12 toward the handle region 11 can extend through a window-like opening 21 provided in the pivot joint region of the attachment part 13 (see also FIG. 11).

The actuating button 12 is respectively displaced into the actuating position according to FIG. 11 by a housing section 31 of the attachment part 13 or a housing section 31 of the collar 14 for the duration of the arrangement of the attachment part 13 on the handle region 11.

Accordingly, a working process can initially be carried out with the attachment of the attachment part 13 as a result of the thusly caused initiation by means of the actuating button 12, wherein said working process preferably ends automatically in the form of a valve-controlled piston return and an associated return pivoting motion or return motion of the working jaws 3 and 4. With respect to the exemplary return valve used for this purpose, we refer, for example, to WO 2016/134951 A1. The content of this patent application is hereby also fully incorporated into the disclosure of the present invention, namely also for the purpose of incorporating characteristics of this patent application into claims of the present invention.

According to the aforementioned WO application, it is also known to initiate such a return valve electronically, e.g. electromagnetically by means of a corresponding control signal.

However, it would alternatively also be possible to change over the hand tool 1 to the remote-controlled operation electronically or mechanically prior to the attachment of the attachment part 13 such that the actuation of the actuating button 12 caused by the collar 14 does not initiate a displacement of the working jaws 3 and 4. In this respect, it would also be possible to detect the attachment part 13 automatically, preferably already in the course of the attachment.

After the attachment of the attachment part 13, the hand tool 1 preferably is only controlled remotely, e.g. as a result of using an electrical or mechanical remote control, preferably in the form of a radio remote control. For this purpose, the hand tool 1 may comprise a radio receiver 32, as well as at least one control unit 33 that converts the received radio signals into an initiation of a working motion.

A handling extension 23 can be arranged on the attachment part 13. This handling extension may have the rod-like design shown with a handle 24 on its free end. An actuating element 25 for initiating a working motion of the hand tool 1 remotely is preferably arranged in or near the handle 24. This actuating element may be realized in the form of a conventional switch or a mechanically acting pushbutton, but also, for example, in the form of a capacitive sensor.

The handling extension 23 comprises a rod 26 that optionally can be extended telescopically, wherein a counter holding formation 27, which is designed for interacting with the holding formation 18 of the attachment part 13, is arranged on said rod opposite of the handle 24.

As indicated in the figures, the counter holding formation 27 may comprise two disk-like clamping parts 28 that are spaced apart from one another and may be connected to one another by means of a not-shown threaded pin, which in the holding position engages into the U-opening 19 of the holding formation 18.

At least one of the clamping parts 28 may comprise a plurality of projections 29 that protrude radially inward and preferably are spaced apart from one another uniformly in the circumferential direction. Depressions 30, into which the projections 29 can penetrate, are formed in the holding formation 18 opposite of said projections.

As a result of the above-described design, the handling extension 23 can with respect to its longitudinal extent be arranged on the attachment part 13 in different angular positions relative to the longitudinal axis x of the attachment part 13, wherein the angular position fixed as a result of tensioning may be secured, e.g., due to the engagement of the projections 29 into the depressions 30.

Furthermore, a radio transmitter 34 may be provided in the handling extension 23 in order to transmit a signal to the radio receiver 32 in the hand tool 1 upon the actuation of the actuating element 25.

The function of the actuating element 25 in the handling extension 23 is equivalent to the function of the actuating button 12 in the hand tool 1. According to a preferred embodiment, a complete working process preferably requires an actuation of the actuating element 25 up to the end of the working process. Accordingly, a permanent signal up to the completion of the working process, e.g. the closing process of the working jaws, is absolutely essential in a potential embodiment. In a preferred embodiment, an interruption of the radio signal results in the intermediate stop of the working motion, in this case particularly the immediate stop of the forward motion of the piston. This may occur intentionally, but also as a result of an unintentional separation of the radio connection. In any case, the hand tool 1, particularly its piston and the working jaws 3 and 4 connected thereto, returns into a release position after the expiration of a predefined time period, e.g. 20, 30 or 40 seconds.

The preceding explanations serve for elucidating all inventions that are included in this application and respectively enhance the prior art independently with at least the following combinations of characteristics, wherein two, more or all of these combinations of characteristics may also be combined with one another, namely:

A hand tool 1 prepared for remote control, which is characterized by a removable attachment part 13 that is held in the handle region 11, wherein the attachment part 13 has a handling extension 23;

A hand tool 1, which is characterized in that the handling extension 23 is designed for being coupled to the attachment part 13 in different angular orientations referred to a longitudinal axis x of the attachment part 13;

A hand tool 1, which is characterized in that the attachment part 13 is designed for acting upon the actuating button 12;

A hand tool 1, which is characterized in that the hand tool 1 is designed for radio remote control and for this purpose comprises a radio receiver 32 and a control unit, which is designed for converting received radio signals into an initiation of a working motion of the hand tool 1;

A hand tool 1, which is characterized in that the handling extension 23 has an actuating element 25 for initiating a working motion of the hand tool 1 remotely and/or that the handling extension 23 preferably has a radio transmitter 34, which is functionally connected to the actuating element 25 and serves for functionally interacting with the radio receiver 32 of the hand tool 1;

A hand tool 1, which is characterized in that the attachment part 13 is realized in the form of a collar 14, which is designed for encompassing the handle region 11 and/or that the collar 14 preferably consists of two collar parts 15, 16, which are pivotably connected to one another, and/or that a collar part 15, 16 preferably is realized in a half shell-shaped manner and/or that the collar parts 15, preferably can be mechanically interlocked in the encompassing position;

A hand tool 1, which is characterized in that a holding formation 18 for the handling extension 23 is provided on the attachment part 13 and/or that the holding formation 18 preferably comprises a plurality of projections for engaging into depressions in the handling extension 23 or that the holding formation 18 comprises a plurality of depressions 30 for receiving projections 29 on the handling extension 23;

A hand tool 1, which is characterized in that the hand tool 1 comprises an electric motor 9, which can be actuated in order to carry out a working motion, and/or that the electric motor 9 preferably drives a spindle and/or that the electric motor 9 preferably drives a hydraulic pump 8 for acting upon a hydraulically actuated working piston;

A hand tool 1, which is characterized in that the hand tool 1 comprises one or more working jaws 3, 4, which can be moved from a release position into a working position and from a working position into a release position, and/or that the hand tool 1 is preferably designed for automatically moving the working jaw 3, 4 from the working position into the release position after the expiration of a predefined time period;

A hand tool 1, which is characterized in that a current-conducting connection produced as a result of a depressed actuating button 12 is without a motion of the actuating button 12 interrupted after the expiration of a predefined time period.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

List of Reference Symbols
1 Hand tool
2 Working head
3 Working jaw
4 Working jaw
5 Return valve
6 Tank
7 Pump tappet
8 Hydraulic medium pump
9 Electric motor
10 Accumulator
11 Handle region
12 Actuating button
13 Attachment part
14 Collar
15 Collar part
16 Collar part
17 Bracket
18 Holding formation
19 U-opening
20 Screw connection
21 Opening
22 Housing tang
23 Handling extension
24 Handle
25 Actuating element
26 Rod
27 Counter holding formation
28 Clamping part
29 Projection
30 Depression
31 Housing section
32 Radio receiver
33 Control unit
34 Radio transmitter
u Longitudinal axis
x Longitudinal axis
y Pivoting axis

The invention claimed is:

1. A hand tool that is prepared for remote control comprising:
a handle region;
an actuating button; and
an attachment part which is configured to be removably attached to the handle region, the attachment part including first and second collar parts pivotably connected together and configured to surround the handle region, wherein at least one of the collar parts forming a housing section, wherein the actuating button is displaced into an actuating position by engagement with the housing section when the collar parts surround the handle region; and
a handling extension coupled to the attachment part.

2. The hand tool according to claim 1, wherein the handling extension is pivotally coupled to the attachment part, wherein the handling extension can be positioned in different angular orientations relative to a longitudinal axis of the attachment part.

3. The hand tool according to claim 1, further comprising a radio receiver and a control unit configured to convert received radio signals into an initiation of a working motion of the hand tool.

4. The hand tool according to claim 1, wherein the handling extension includes an actuating element configured to initiate a working motion of the hand tool remotely.

5. The hand tool according to claim 4, wherein the handling extension includes a radio transmitter operatively connected to the actuating element and which interacts with the radio receiver.

6. The hand tool according to claim 1, wherein each collar part is shaped as a half shell.

7. The hand tool according to claim 6, further comprising a lock configured to mechanically lock the collar parts together around the handle region.

8. The hand tool according to claim 1, wherein the attachment part includes a holding formation provided thereon which is configured to connect to the handling extension.

9. The hand tool according to claim 8, wherein the holding formation comprises a plurality of projections configured to engage into depressions in the handling extension.

10. The hand tool according to claim 8, wherein the holding formation comprises a plurality of depressions configured to receive projections on the handling extension.

11. The hand tool according to claim 1, further comprising an electric motor which is actuable to carry out a working motion.

12. The hand tool according to claim 11, wherein the electric motor drives a hydraulic pump configured to act upon a hydraulically actuated working piston.

13. The hand tool according to claim 1, further comprising one or more working jaws coupled to the handle region which can be moved from a release position into a working position and from the working position into the release position.

14. The hand tool according to claim 13, wherein the one or more working jaws are moved from the working position into the release position after an expiration of a predefined time period.

15. The hand tool according to claim 1, wherein a current-conducting connection produced as a result of a depression of the actuating button is without a motion of the actuating button interrupted after an expiration of a predefined time period.

16. The hand tool according to claim 1, further comprising a lock configured to mechanically lock the collar parts together around the handle region.

17. A hand tool that is prepared for remote control comprising:
   a handle region;
   an actuating button on the handle region;
   a housing tang extending from the handle region; and
   a removable attachment part including two collar parts pivotably connected at a pivot joint region, wherein the collar parts are configured to be attached to the handle region with the housing tang extending through an opening provided in the pivot joint region; and
   a handling extension coupled to the attachment part.

18. The hand tool according to claim 17, wherein the attachment part is configured to act upon the actuating button to actuate the hand tool.

19. The hand tool according to claim 17, further comprising a radio receiver and a control unit configured to convert received radio signals into an initiation of a working motion of the hand tool.

* * * * *